United States Patent
Oosting et al.

(10) Patent No.: US 8,016,072 B2
(45) Date of Patent: Sep. 13, 2011

(54) COMPOSITE HEADLINER WITH IMPROVED ACOUSTIC PERFORMANCE

(75) Inventors: Peter J. Oosting, Grand Rapids, MI (US); Kevin J. Blauwkamp, Zeeland, MI (US); Kevin A. Tomasek, Zeeland, MI (US); Brad M. Everest, Holland, MI (US); Jeffrey A. DeYoung, South Haven, MI (US); Brent D. Rockafellow, Holland, MI (US); Jack L. Johnson, Holland, MI (US); Benoit Pivert, Haguenau (FR)

(73) Assignee: Johnson Controls Technology, Holland, MI (US)

( * ) Notice: Subject to any disclaimer, the term of this patent is extended or adjusted under 35 U.S.C. 154(b) by 0 days.

(21) Appl. No.: 12/670,702

(22) PCT Filed: Jul. 28, 2008

(86) PCT No.: PCT/US2008/071359
§ 371 (c)(1),
(2), (4) Date: May 6, 2010

(87) PCT Pub. No.: WO2009/018218
PCT Pub. Date: Feb. 5, 2009

(65) Prior Publication Data
US 2010/0219014 A1 Sep. 2, 2010

Related U.S. Application Data

(60) Provisional application No. 60/952,360, filed on Jul. 27, 2007.

(51) Int. Cl.
E04B 1/82 (2006.01)
E04B 1/84 (2006.01)
E04B 1/74 (2006.01)
B62D 33/06 (2006.01)

(52) U.S. Cl. ........ 181/290; 181/294; 181/286; 296/39.3

(58) Field of Classification Search .................. 181/290, 181/294, 296, 204, 286; 296/39.3; 442/374, 442/370, 373; 428/317.1, 354, 355 EP
See application file for complete search history.

(56) References Cited

U.S. PATENT DOCUMENTS
4,054,710 A * 10/1977 Botsolas ........................ 442/31
(Continued)

FOREIGN PATENT DOCUMENTS
EP 0 999 950 B1 5/2004
(Continued)

OTHER PUBLICATIONS

International Search Report for corresponding PCT, Application No. PCT/US2008/071359, dated Jul. 28, 2008, Published as WO 2009/018218 on Feb. 5, 2009.

(Continued)

Primary Examiner — Edgardo San Martin
(74) Attorney, Agent, or Firm — Dobrusin & Thennisch PC

(57) ABSTRACT

A composite headliner material allows sound waves originating within a vehicle to penetrate deeply into the headliner where all of a significant portion of their energy is absorbed rather than reflected back into the vehicle. The coverstock sheet is backed by a multilayer material with a foam core coated above and below by a fibrous glass mat impregnated with an adhesive with scrim layers above and below glass mat layers.

15 Claims, 2 Drawing Sheets

U.S. PATENT DOCUMENTS

| | | | |
|---|---|---|---|
| 4,350,734 A | 9/1982 | Hammond et al. | |
| 5,417,974 A * | 5/1995 | Sekiyama et al. | 424/411 |
| 5,474,109 A * | 12/1995 | Stoeppelmann et al. | 138/137 |
| 5,484,183 A | 1/1996 | Rosa | |
| 5,486,256 A | 1/1996 | Romesberg et al. | |
| 6,204,209 B1 | 3/2001 | Rozek et al. | |
| 6,368,702 B1 * | 4/2002 | Erickson | 428/292.1 |
| 7,025,408 B2 * | 4/2006 | Jones et al. | 296/186.1 |
| 7,032,949 B1 | 4/2006 | Wang et al. | |
| 2003/0044580 A1 | 3/2003 | Gorowlcz et al. | |
| 2003/0124314 A1 | 7/2003 | Michael et al. | |
| 2004/0000062 A1 | 1/2004 | Hansen et al. | |
| 2004/0066056 A1 | 4/2004 | Mills et al. | |
| 2004/0231915 A1 | 11/2004 | Thompson, Jr. et al. | |
| 2006/0201741 A1 | 9/2006 | Inoue et al. | |
| 2008/0083720 A1 | 4/2008 | Gentile et al. | |
| 2008/0093890 A1 | 4/2008 | Mehling et al. | |

FOREIGN PATENT DOCUMENTS

| | | |
|---|---|---|
| JP | 10053953 A * | 2/1998 |
| WO | 92/20489 A1 | 11/1992 |
| WO | 2004/030959 A | 4/2004 |
| WO | 2010/045438 A1 | 4/2010 |

OTHER PUBLICATIONS

Preliminary Report for corresponding PCT Application No. PCT/US2008/071359, dated Jul. 28, 2008, Published as WO 2009/018218 on Feb. 5, 2009.

Written Opinion for corresponding PCT, Application No. PCT/US2008/071359, dated Jul. 28, 2008, Published as WO 2009/018218 on Feb. 5, 2009.

* cited by examiner

COMPOSITE HEADLINER WITH IMPROVED ACOUSTIC PERFORMANCE

CLAIM OF BENEFIT OF FILING DATE

The present application claims the benefit of the filing date of PCT Application Serial No. PCT/US2008/071359 (filed Jul. 28, 2008) (Published as WO 2009/018218) and 60/952,360 (filed Jul. 27, 2007), the contents of which are hereby incorporated by reference in their entirety.

CROSS-REFERENCE TO RELATED PATENT APPLICATION

This application claims the benefit of U.S. Provisional Patent Application No. 60/952,360 filed Jul. 27, 2007, which is hereby incorporated by reference in its entirety.

FIELD OF THE INVENTION

This invention relates to a vehicle panel such as a composite headliner that provides improved acoustic performance.

BACKGROUND

FIG. 1 shows a conventional vehicle panel 90 that includes a decorative coverstock material 112, a coverstock foam layer 114, an air-impermeable adhesive barrier layer 116, a lower glass mat layer 120, a core foam layer 130, an upper glass mat layer 160, and a scrim layer 140. The upper glass mat layer 160, the core foam layer 130, and the lower glass mat layer 120 are adhered together using a thermosetting adhesive, such as, for example methylene diphenyl diisocyanate ("MDI"), along with a catalyst, which can be sprayed on or rolled on to the core foam layer 130, between the upper glass mat layer 160 and the core foam layer 130 and between the lower glass mat layer 120 and the core foam layer 130 to form a rigid composite reinforcing layer. Because the process uses a thermosetting adhesive, such as MDI, as opposed to using an adhesive film or a hot melt adhesive to bind the upper glass mat layer 160 and lower glass mat layer 120 to the core foam layer, the adhesive flows through the upper glass mat layer 160 and lower glass mat layer 120. This is advantageous, as the upper adhesive layer can also be used to adhere a coverstock laminate 105, comprising the decorative coverstock material 112, the coverstock foam layer 114, and the adhesive barrier 116, to the lower surface of the upper glass mat layer 160. In many cases, the adhesive barrier 116 is the same as the scrim layer 140.

The composite headliner is formed by placing the various layers, including the coverstock laminate, between two plates of a press and applying heat and pressure to the stack of layers. The pressure forces the MDI adhesive through the upper glass mat layer 160 and lower glass mat layer 120 to adhere the various layers together, while the heat and the catalyst causes the MDI adhesive to cure or set and forms the composite matrix.

However, at the same time, if not prevented, the MDI adhesive can flow to areas where it is not desired. Specifically, such areas include the tool surfaces used to heat and compress the various layers and the decorative coverstock composite material. In particular, the MDI adhesive can mar or otherwise negatively affect the appearance of the surface of the decorative coverstock material 112 if it were allowed to reach the decorative coverstock material 112 or the coverstock foam 114, such as, for example, by causing pits, bumps, adhesive bleed through, and ripples in the surface. Accordingly, the scrim layer 140 and the adhesive barrier layer 116 protect the tool surfaces and the decorative coverstock material 112 and coverstock foam layer 114, respectively, by preventing the MDI adhesive from flowing past the scrim layer 140 and adhesive barrier layer 116.

SUMMARY

The present disclosure relates to a thermosetting composite headliner, comprising a porous open-cell, semi-rigid foam core; a porous fibrous reinforcement layer adjacent the porous open-cell, semi-rigid foam core; a coverstock sheet adjacent the porous fibrous reinforcement layer; and adhesive material that binds together the porous open-cell, semi-rigid foam core, the porous fibrous reinforcement layer and the coverstock sheet, the adhesive material comprising a cured liquid adhesive, wherein the coverstock sheet comprises a coverstock material layer, a coverstock foam layer, and an adhesive barrier comprising a non-woven polyethylene terephthalate ("PET") material that allows sound waves or energy to pass from the coverstock material layer into the porous fibrous reinforcement layer and that reduces an ability of the liquid adhesive to pass through the adhesive barrier and into at least the coverstock foam layer.

The present disclosure also relates to a method for producing a composite headliner, comprising applying adhesive to the top surface and bottom surface of the foam core; placing a fibrous layer to the adhesive coated surface of the foam core; placing a scrim layer next to the lower porous fiber layers; preparing a coverstock sheet comprising a coverstock material layer and an adhesive barrier; and applying heat and pressure to the layered materials with a hot press.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF THE DRAWINGS

Various exemplary embodiments of the systems and methods according to this invention will be described in detail, with reference to the following figures, wherein.

DETAILED DESCRIPTION

This invention relates to a composite headliner that has improved acoustic properties, comprising a decorative coverstock material, a coverstock foam layer, an adhesive barrier layer that allows sound energy to pass through while reducing the ability of adhesive from passing through, an upper porous fibrous layer, a foam core layer, an upper adhesive material adhering the adhesive barrier layer and the upper fibrous layer to the foam core layer, a lower porous fibrous layer, a scrim layer, and an lower adhesive material adhering the scrim layer and the lower fibrous layer to the foam core layer.

This invention also relates to a thermosetting composite headliner, comprising a porous open-cell, semi-rigid foam core, a porous fibrous reinforcement layer adjacent the porous open-cell, semi-rigid foam core, a coverstock sheet adjacent the porous fibrous reinforcement layer and adhesive material that adhesively connects together the porous open-core, semi-rigid foam core, the porous fibrous reinforcement layer and the coverstock sheet, the adhesive material comprising a cured polyurethane (e.g., MDI and a polyol) adhesive, wherein the coverstock sheet comprises a coverstock material layer, a coverstock foam layer and an adhesive barrier comprising a non-woven polyethylene terephthalate ("PET") material that allows sound waves or energy to pass from the coverstock material layer into the porous fibrous reinforcement layer and that reduces an ability of the liquid adhesive to pass through the adhesive barrier and into at least the coverstock foam layer.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the FIGURES. It should be recognized that the orientation of particular components may vary greatly depending on the application in which they are used.

Figure 1:
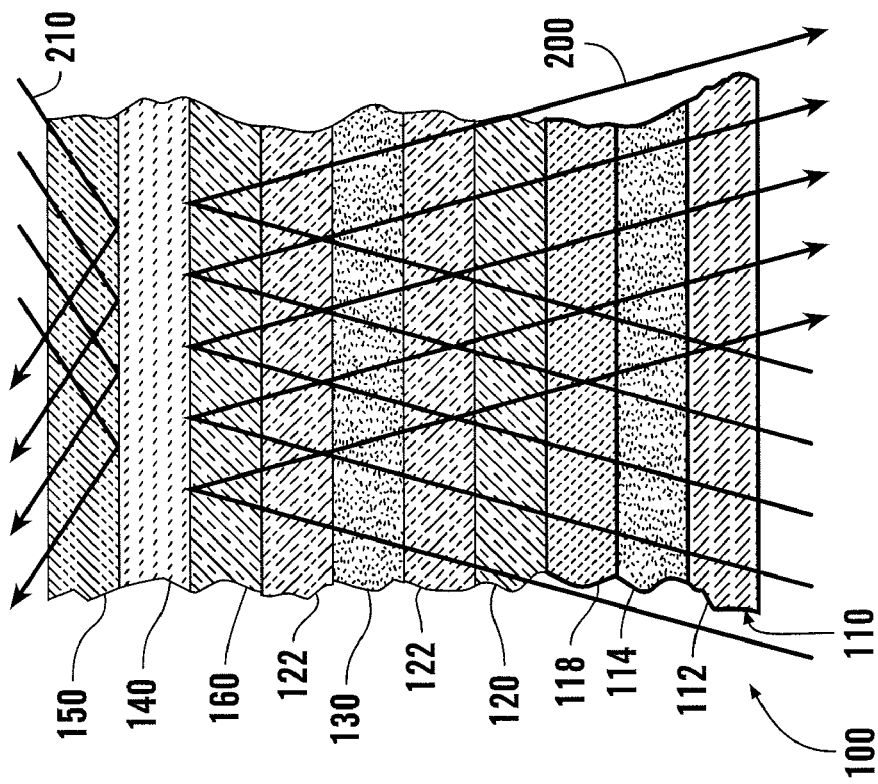
FIG. 1 is a schematic view of a conventional composite headliner.

As shown in FIG. 1, the inventors have determined that the conventional adhesive barrier layer 116 acts as a barrier to sound waves and other types of acoustic energy. While this is advantageous when the sound energy arises outside of the passenger compartment (external sound 210), this is not advantageous for sound energy that travels from the passenger compartment into the composite headliner. In such situations, the conventional adhesive barrier layer 116 reflects the internal sound energy 200 back through the coverstock foam 114 and decorative coverstock material 112 and into the passenger compartment. Because the coverstock foam 114 is typically relatively thin and the decorative coverstock material 112 is not designed to attenuate sound energy, the composite headliner 105 does not absorb or dissipate substantial amounts of sound energy.

Both U.S. Pat. Nos. 6,204,209 and 6,368,702, each of which is incorporated herein by reference in its entirety, disclose a composite headliner having a foam core and adjacent fibrous layers. The '209 Patent outlines how this composite headliner has improved acoustic properties due to the sound absorbing characteristics of the foam core and fibrous layers.

The inventors have discovered that the acoustic properties of a composite headliner such as that shown in FIG. 1 can be improved if the adhesive barrier can be modified to allow sound energy to pass through it to the underlying fibrous layers and foam core, while maintaining the competing adhesive barring characteristics of the adhesive barrier. The inventors have developed a composite headliner that includes a barrier that allows for improved acoustic performance while having the ability to slow the movement of the adhesive into the coverstock composite.

Figure 2:
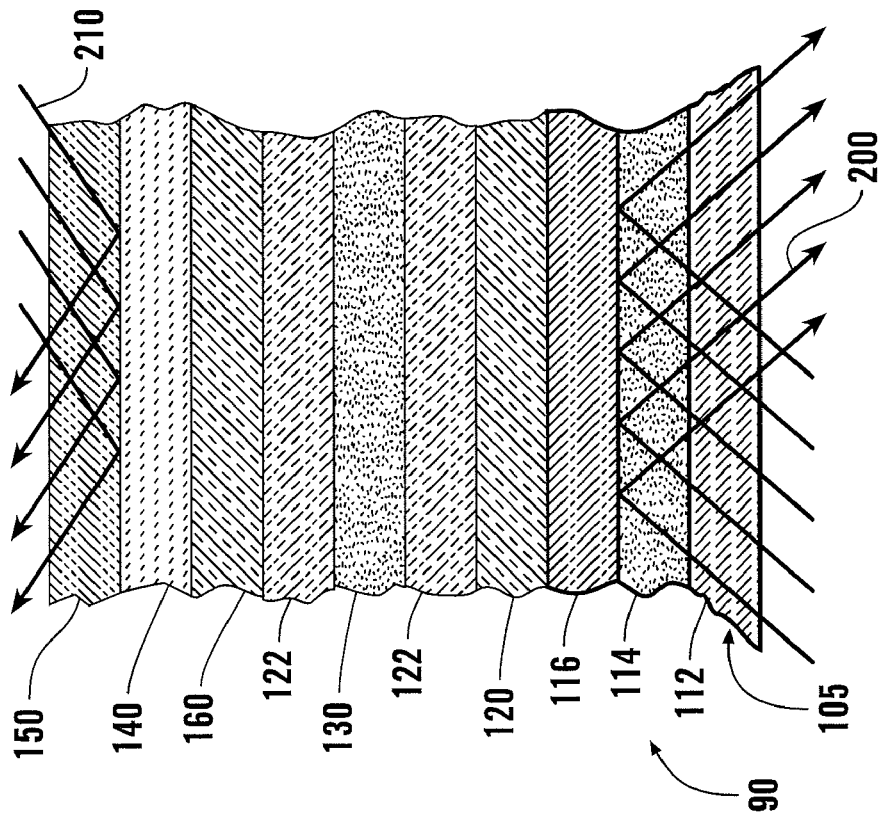
FIG. 2 is a schematic view of a composite headliner according to this invention.

FIG. 2 schematically illustrates one exemplary embodiment of a composite headliner 100 having improved acoustic performance according to this invention. As shown in FIG. 2, the composite headliner 100 includes a three-layer laminated, or trilaminate, coverstock sheet 110, a lower porous fibrous layer 120, a lower adhesive layer 122, an at least semi-rigid foam core 130, an upper adhesive layer 122, an upper porous fibrous layer 160, a scrim layer 140, and a release sheet 150. It should be appreciated that the release sheet can be omitted if it is not necessary. The trilaminate coverstock sheet 110 includes a coverstock material layer 112, a coverstock foam layer 114, and a sound-permeable adhesive barrier 118. The upper and lower adhesive layers 122 may include a liquid adhesive and a catalyst that causes the liquid adhesive to cure when heated.

As shown in FIG. 2, sound waves or energy 200 from the passenger compartment impinge on the passenger surface (also called the "show surface" or "A surface") of the composite headliner 100. Likewise, external sound waves or energy 210 impinge on the exterior side of the composite headliner 100. As shown in FIG. 1, in conventional composite headliner 90, the sound waves or energy from the passenger compartment pass through the coverstock material and coverstock foam, but reflect off of the adhesive barrier back into the passenger compartment. Thus, the other layers of the composite headliner are not able to contribute to the sound absorbing quality of the conventional headliner. As shown in FIG. 1, the conventional scrim layer 14 is able to reduce the ability of the sound waves or energy from the exterior side of the composite headliner from entering the passenger compartment through the composite headliner. Furthermore, any external sound 210 that did penetrate scrim layer 140 would be effectively blocked by at least conventional adhesive barrier 116.

As shown in FIG. 2, a composite headliner 100 according to this invention includes an adhesive barrier 118 that more readily allows the sound waves or energy 200 impinging on the composite headliner 100 from the passenger compartment to pass through the adhesive barrier 118, the lower porous fibrous layer 120, the foam core 130, and the upper porous fibrous layer 160. It should be appreciated that the sound waves or energy 200 are at least partially absorbed in these layers that underlie the adhesive barrier, attenuating the sound waves or energy 200. Furthermore, as shown in FIG. 2, should the sound waves or energy 200 reach the scrim layer 140 and be reflected back towards the passenger compartment, the upper porous fibrous layer 160, the foam core 130, and the lower porous fibrous layer 120 absorb more of the reflected sound waves or energy, further attenuating the sound waves or energy 200. Thus, even if some portion of the sound waves or energy 200 re-enters the passenger compartment from the composite headliner 100, the sound waves or energy 200 are significantly attenuated.

It should further be appreciated that, in some exemplary embodiments of the composite headliner 100, the adhesive barrier 118 also tends to reflect sound waves or energy 210 that impinge on the composite headliner 100 from the vehicle side of the composite headliner.

In the exemplary embodiment shown in FIG. 2, the coverstock material layer 112 is a sheet of Rhonby fabric and is about 0.5 mm thick. However, it should be appreciated that any known or later-developed material can be used as desired as the coverstock material layer 112, and the thickness of the coverstock material layer 112 will vary depending on the selected material. In the exemplary embodiment shown in FIG. 2, the coverstock foam layer 114 is shown as a layer of polyurethane foam having a finished foam thickness of at least 2.25 mm. Typically, the coverstock foam layer 114 will have a pre-mold thickness of about 2 mm to about 4 mm, while the finished foam thickness of the coverstock foam layer 114 after molding will be about 1 mm to about 3 mm. It should be appreciated that any desired known or later-developed foam material can be used as the coverstock foam layer 114. It should be appreciated that the coverstock material can be technical or non-technical.

As shown in FIG. 2, in the illustrated exemplary embodiment, the sound-permeable adhesive barrier 118 is a non-woven layer or mat of PET fibers. In an exemplary embodiment, the adhesive barrier 118 is about 0.8 mm to about 1.3 mm thick before molding, and about 0.6 mm to about 1.1 mm thick after molding. The adhesive barrier 118 does not allow the upper adhesive layer 122 to bleed through into the coverstock foam layer 114 or the coverstock material layer 112 but allows sound waves or energy 200 to pass through into the underlying upper porous fibrous layer 160 and/or lower porous fibrous layer 120. If the upper adhesive layer 122 bleeds into, and possibly through, the coverstock foam layer 114, the liquid adhesive of the upper adhesive layer 122 will cause surface defects in the composite headliner 100, which means that that particular composite headliner 100 would have to be scrapped.

In one exemplary embodiment, the sound-permeable adhesive barrier is a layer of Dutexim (e.g., Dutexim 41-12C), which is manufactured by Tharreau Industries, of Chemille, France. However, it should be appreciated that any material which is able to sufficiently reduce the ability of the liquid components of the upper adhesive layer 122 to flow into the coverstock sheet 110 so that the appearance and function of the coverstock sheet 110 is not degraded, while at the same time allowing sound waves or energy 200 to pass through the adhesive barrier 118 and into at least the upper porous fibrous layer 120, can be used as the sound-permeable adhesive barrier 118. Thus, for example, various non-woven PET layers or mats may be used. For example, the sound-permeable adhesive barrier 118 may comprise PGI GS-35 (manufactured by Polymer Group, Inc. of Charlotte, N.C.) with a hydro-resistive fluorocarbon treatment.

In general, the inventors have determined that the characteristics of the PET non-woven mat affect the acoustic and adhesive blocking performance of the adhesive barrier 118. The fiber material used to form the adhesive barrier 118, the diameter of the fibers of the selected material, and the coating, if any, on the mat or layer of the selected fibers should be appropriately selected, as each contributes to the ability of the adhesive barrier 118 to block the adhesive while allowing sound to travel through to the underlying upper porous fibrous layer 160 and/or lower porous fibrous layer 120.

It should be appreciated that, in other exemplary embodiments of the composite headliner 100, a two-layer laminate, or bilaminate, coverstock sheet can be used in place of the trilaminate coverstock sheet 110 shown in FIGS. 1 and 2. In such exemplary embodiments, the bilaminate coverstock sheet includes the coverstock material layer 112 and the adhesive barrier 118, while omitting the coverstock foam layer 114. It should be appreciated that the adhesive barrier 118 in the bilaminate coversheet 110 will also allow sound waves or energy 200 to pass through to at least the lower porous fibrous layer 120 while not allowing the liquid adhesive of the lower adhesive layer 122 to bleed through into the coverstock material layer 112.

In addition to the sound-permeable adhesive barrier 118, the composite headliner 100 also desirably uses a less dense, more open cell core polyurethane (PU) foam as the foam core 130. Using a less dense, more open core polyurethane foam as the foam core 130 also allows needle punching of the foam core 130 to be reduced, and ideally eliminated. Needle punching is sometimes done on polyurethane foam layers to improve their acoustic characteristics or performance. Of course, it should be appreciated that needling or capping the foam core 130 allows for a non open celled foam material to be used. However, needling is an additional process which adds cost. It should be appreciated that using an open cell foam in the foam core 130 also increases the acoustic performance of the composite.

As shown in FIG. 2, in the illustrated exemplary embodiment, the foam core 130 is a layer polyurethane foam. For example, the foam core 130 may be Woodbridge Stratas 1615 polyurethane foam (manufactured by Woodbridge Sales & Engineering, Inc., of Troy, Mich.). Another suitable material is Woodbridge Stratas 1220 polyurethane foam. It should be appreciated that any semi-rigid foam having suitable acoustic characteristics can be used in the foam core 130. In the exemplary embodiments shown in FIGS. 1 and 2, the foam core 130 has a pre-mold thickness of about 8 mm and a post-mold thickness of about 7 mm. It should be appreciated that the thickness of the foam core 130 can range from about 5 mm, or even less, to about 14 mm, or even more. In general, the thicker the foam core 130 is, the better the acoustic performance of the composite headliner 100 will be.

The upper porous fibrous layer 160 and lower porous fibrous layer 120 can also be desirably selected to further improve the acoustic characteristics of the composite headliner 100. In the exemplary embodiment shown in FIG. 2, the upper porous fibrous layer 160 and lower porous fibrous layer 120 are formed using fiberglass mats. Typically, each of the upper porous fibrous layer 160 and lower porous fibrous layer 120 will have pre-mold and post-mold thicknesses of about 0.5 min to about 0.7 mm. It should be appreciated that any appropriate known or later developed material can be used in the upper porous fibrous layer 160 and lower porous fibrous layer 120, so long as the upper porous fibrous layer 160 and lower porous fibrous layer 120 provide a desired amount of reinforcement and a desired level of acoustic performance. In various embodiments, the foam core may have a thickness from about 3 to 15 mm.

It should be appreciated that the thicknesses of the above-outlined layers will typically vary throughout the manufacturing process. It should also be appreciated that it may be desirable to reduce the thickness and/or weight of the composite headliner 100. This can be accomplished by reducing the thickness or weight, as desired, of one or more of the foam core 130, the upper glass mat layer 160 and/or lower porous fibrous layers 120, the scrim layer 140 and/or the coverstock sheet 110. For example, a foam core having a 5 mm pre-mold thickness and/or a thinner and/or less-dense fibrous layer could be used in place of those layers discussed above.

Figure 3:
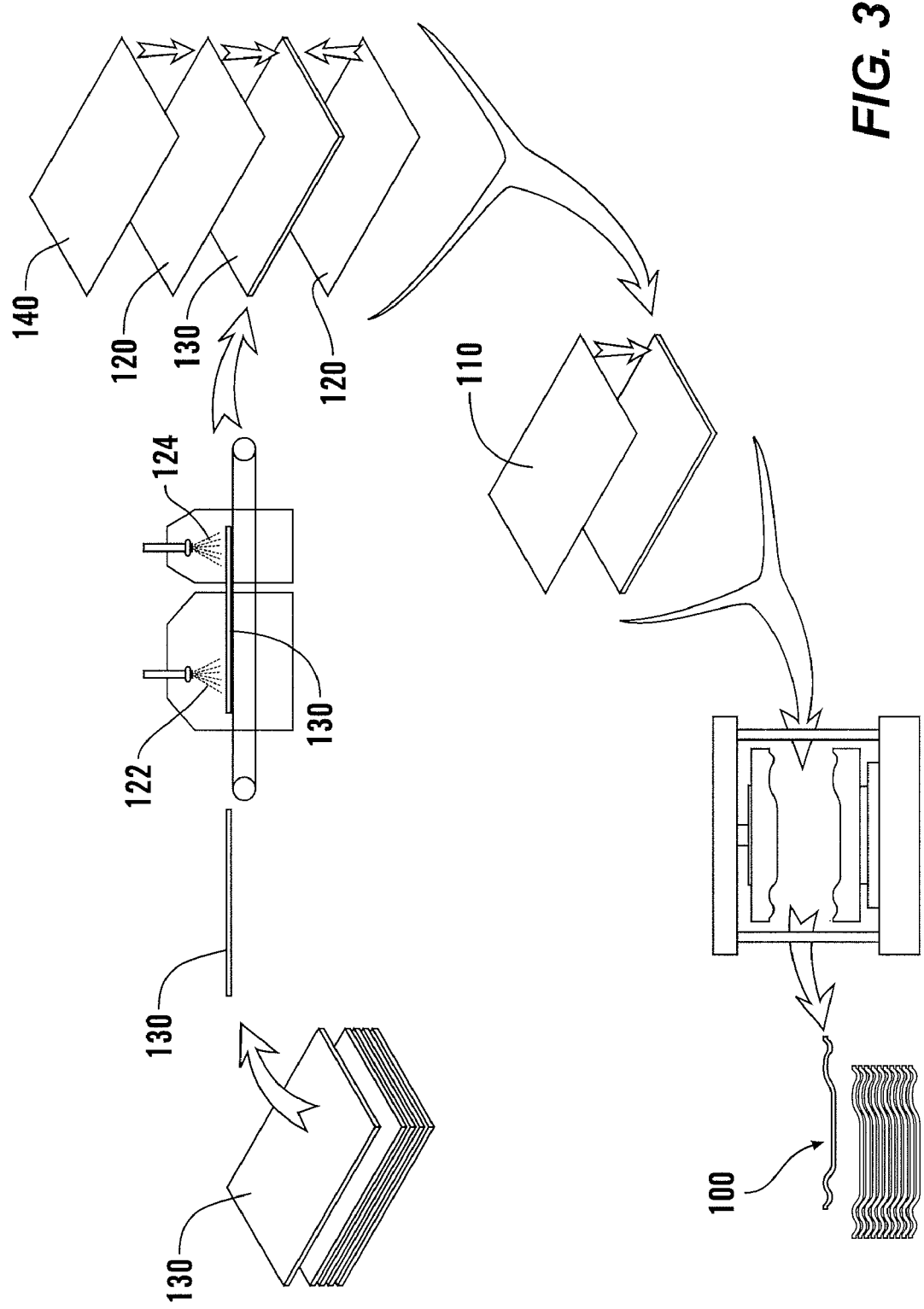
FIG. 3 is a schematic representation of a process for forming the composite headliners shown in FIG. 2.

FIG. 3 illustrates one exemplary embodiment of a manufacturing process usable to manufacture the composite headliner 100. As shown in FIG. 3, the foam core 130 passes through a first station, where a liquid adhesive and then the catalyst 124 is sprayed onto each surface of the foam core 130 to form the upper and lower adhesive layers 122. Then, the upper porous fibrous layer 160 and lower porous fibrous layer 120 are placed next to the foam core 130, and the scrim layer 140 is placed next to the upper porous fibrous layer 160. The release sheet 150, if used, is then placed next to the scrim layer 140, although this is not shown in FIG. 3.

The coverstock sheet 110, comprising the coverstock material layer 112, the (optional) coverstock foam layer 114, and the adhesive barrier 118, is then placed next to the lower porous fibrous layer 120.

The resulting stack of layers is then placed in a hot press, which applies heat and pressure to the resulting stack to form the composite headliner 100. The pressure and heat cause the liquid adhesive to flow into the foam core 130 and to flow through the upper porous fibrous layer 160 and lower porous fibrous layer 120 and against the scrim layer 140 and the adhesive barrier 118. At the same time, the heat and pressure cause the catalyst to cure the liquid adhesive, bonding together the adhesive barrier 118, and thus the coverstock sheet 110, the upper porous fibrous layer 160 and lower porous fibrous layer 120, the foam core 130 and the scrim layer 140 to form the composite headliner 100. At the same time, the heat and pressure form the composite and set the adhesive in the composite headliner 100 to match the shape of the molds used in the hot press.

In various embodiments, the hot press is operated at a temperature of about 100 to about 160 degrees centigrade. More particularly, the hot press is operated at temperatures from about 120 to about 160 degrees centigrade. The headliner will be in the press for about 30 to about 60 seconds. As illustrated in FIG. 3, the hot press may be designed to impart a desired shape to the headliner.

FIG. 3 further shows an exploded view of the resulting composite headliner 100, with the adhesive barrier 118 identified as a scrim layer between the coverstock material layer 112 and the optional coverstock foam layer 114 (which is referred to as a face good layer in FIG. 3) and the upper adhesive-saturated porous fibrous layer 120 (which is referred to as a saturated glass mat in FIG. 3).

It should be understood that the drawings are not necessarily to scale (e.g., the relative thickness of various layers as shown does not necessarily reflect the relative thickness of the actual layers). In certain instances, details that are not necessary to the understanding of the invention or render other details difficult to perceive may have been omitted. It should be understood, of course, that the invention is not necessarily limited to the particular embodiments illustrated herein.

It is also important to note that the above-outlined construction and arrangement of the elements of the composite headliner 100 is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.). For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). It should be noted that the elements and/or assemblies of the system may be constructed from any of a wide variety of materials that provide sufficient acoustic performance, in any of a wide variety of colors, textures, and combinations. Accordingly, all such modifications are intended to be included within the scope of the following claims. Other substitutions, modifications, changes and omissions may be made in the design, operating conditions and arrangement without departing from the spirit of the present inventions. Also, although the disclosed composite material has been illustrated in the form of a headliner, it should be understood that the material may be used on any interior surface of a vehicle or wherever acoustic energy absorption is desired.

What is claimed is:

1. A composite headliner, comprising: a porous open-cell, semi-rigid foam core; a porous fibrous reinforcement layer adjacent the porous open-cell, semi-rigid foam core; a coverstock sheet adjacent the porous fibrous reinforcement layer; and adhesive material that binds together the porous open-cell, semi-rigid foam core, the porous fibrous reinforcement layer and the coverstock sheet, the adhesive material comprising a cured liquid adhesive, wherein the coverstock sheet comprises: a coverstock material layer, a coverstock foam layer, and an adhesive barrier comprising a non-woven needle punched polyethylene terephthalate material that allows sound waves or energy to pass from the coverstock material layer into the porous fibrous reinforcement layer and that reduces an ability of the liquid adhesive to pass through the adhesive barrier and into at least the coverstock foam layer.

2. The headliner of claim 1, wherein the adhesive material comprises methylene diphenyl diisocyanate and a polyol.

3. The headliner of claim 1, wherein the coverstock foam layer have a thickness from about 1 mm to about 3 mm.

4. The headliner of claim 1, wherein the adhesive barrier is about 0.6 mm to about 1.1 mm thick.

5. A method for producing a composite headliner, comprising: applying adhesive to a top surface and a bottom surface of a foam core; placing a fibrous layer to the adhesive coated surface of the foam core; placing a scrim layer next to the lower porous fiber layers; preparing a coverstock sheet comprising a coverstock material layer and an adhesive barrier comprising a non-woven needle punched polyethylene terephthalate material that allows sound waves or energy to pass from the coverstock material layer into the porous fibrous reinforcement layer and that reduces an ability of the liquid adhesive to pass through the adhesive barrier and into at least the coverstock foam layer; and applying heat and pressure to the layered materials with a hot press.

6. The method of claim 5, wherein the step of applying adhesive to the foam core is followed by applying a catalyst to the top surface and bottom surface of the foam core.

7. The method of claim 5, further comprising the step of placing a release sheet next to the scrim layer.

8. The method of claim 5, wherein the coverstock sheet further comprises a coverstock foam layer.

9. The method of claim 5, wherein the hot press operates at a temperature of about 100 degrees to about 160 degrees centigrade.

10. The method of claim 9, wherein the hot press operates at a temperature of about 120 degrees to about 160 degrees centigrade.

11. The method of claim 5, wherein the headliner is treated in the hot press for about 30 to about 60 seconds.

12. The headliner of claim 1 wherein the porous open-cell, semi-rigid foam core is a thermoset foam.

13. The headliner of claim 12 wherein the foam core has a thickness of from 5 to 14 mm.

14. The method of claim 5 wherein the foam core comprises a porous open-cell, semi-rigid thermoset foam.

15. The method of claim 14 wherein the foam core has a thickness of from 5 to 14 mm.

\* \* \* \* \*